United States Patent
Snyder et al.

(10) Patent No.: US 9,765,649 B2
(45) Date of Patent: Sep. 19, 2017

(54) BORESCOPE INSPECTION PORT FITTING

(71) Applicant: United Technologies Corporation, Hartford, CT (US)

(72) Inventors: Ryan K. Snyder, Glastonbury, CT (US); Michael Dreher, Prospect, CT (US)

(73) Assignee: United Technologies Corporation, Farmington, CT (US)

( * ) Notice: Subject to any disclaimer, the term of this patent is extended or adjusted under 35 U.S.C. 154(b) by 556 days.

(21) Appl. No.: 14/273,111

(22) Filed: May 8, 2014

(65) Prior Publication Data

US 2014/0334916 A1    Nov. 13, 2014

Related U.S. Application Data

(60) Provisional application No. 61/821,020, filed on May 8, 2013.

(51) Int. Cl.
*F01D 25/28* (2006.01)
*G02B 23/24* (2006.01)
*F01D 21/00* (2006.01)

(52) U.S. Cl.
CPC ......... *F01D 25/285* (2013.01); *F01D 21/003* (2013.01); *G02B 23/2492* (2013.01)

(58) Field of Classification Search
CPC .. F01D 25/285; F01D 21/003; G02B 23/2492
USPC ...................... 415/118, 201, 214.1, 144, 145
See application file for complete search history.

(56) References Cited

U.S. PATENT DOCUMENTS

| 4,815,276 | A * | 3/1989 | Hansel | F01D 25/00 415/118 |
| 5,867,976 | A * | 2/1999 | Ziegler, Jr. | F01D 21/003 415/118 |
| 8,196,934 | B2 * | 6/2012 | Do | F01D 11/005 277/422 |
| 2004/0216468 | A1 * | 11/2004 | Hatcher | F23N 5/08 62/5 |
| 2006/0260323 | A1 * | 11/2006 | Moulebhar | F01D 21/003 60/793 |
| 2008/0164658 | A1 * | 7/2008 | Do | F01D 11/005 277/355 |
| 2011/0123319 | A1 * | 5/2011 | Eastwood | F01D 11/003 415/182.1 |

* cited by examiner

*Primary Examiner* — Hoang Nguyen

(74) *Attorney, Agent, or Firm* — O'Shea Getz P.C.

(57) ABSTRACT

A borescope inspection (BSI) port fitting is provided for a gas turbine engine. The borescope inspection (BSI) port fitting includes a housing with a borescope inspection port.

16 Claims, 8 Drawing Sheets

BORESCOPE INSPECTION PORT FITTING

CROSS-REFERENCE TO RELATED APPLICATIONS

This application claims priority to U.S. Patent Appln. Ser. No. 61/821,020 filed May 8, 2013, which is hereby incorporated herein by reference in its entirety.

BACKGROUND

The present disclosure relates to a gas turbine engine and, more particularly, to a borescope plug assembly for a gas turbine engine.

Borescope inspection (BSI) ports facilitate on-wing inspection of aircraft engine primary gaspath hardware with a fiber optic borescope to expedite frequent engine inspections that otherwise may require disassembly of the engine. Borescope plugs seal the inspection ports during engine operation.

BSI ports are typically directly integrated into the engine case geometry and are positioned to facilitate maintenance accessibility without removal of engine hardware. Oftentimes, the engine case is dense with external hardware such as gearboxes, pumps, air conduits and fluid conduits. Such external hardware can occupy and/or cover desired locations for the BSI ports.

SUMMARY

A borescope inspection (BSI) port fitting for a gas turbine engine according to one disclosed non-limiting embodiment of the present disclosure includes a housing with a borescope inspection port.

In a further embodiment of the present disclosure, a borescope plug may be included and receivable within said borescope inspection port.

In a further embodiment of any of the foregoing embodiments of the present disclosure, said borescope plug is receivable within said borescope inspection port.

In a further embodiment of any of the foregoing embodiments of the present disclosure, said housing includes a tube boss.

In a further embodiment of any of the foregoing embodiments of the present disclosure, said tube boss is transverse to said borescope inspection port.

In a further embodiment of any of the foregoing embodiments of the present disclosure, said housing includes a flange with a plurality of fastener apertures.

In a further embodiment of any of the foregoing embodiments of the present disclosure, said flange is triangular.

An outer case structure with a BSI port for a gas turbine engine according to one disclosed non-limiting embodiment of the present disclosure includes a borescope inspection (BSI) port fitting mounted to the outer case structure to surround said BSI port; an airflow tube mounted to said borescope inspection (BSI) port fitting; and a borescope plug mounted to said borescope inspection (BSI) port fitting.

In a further embodiment of any of the foregoing embodiments of the present disclosure, said borescope inspection (BSI) port fitting includes a tube boss to receive said airflow tube.

In a further embodiment of any of the foregoing embodiments of the present disclosure, said borescope inspection (BSI) port fitting defines a borescope inspection port.

In a further embodiment of any of the foregoing embodiments of the present disclosure, said tube boss is transverse to said borescope inspection port.

In a further embodiment of any of the foregoing embodiments of the present disclosure, said borescope plug is threaded into said borescope boss.

In a further embodiment of any of the foregoing embodiments of the present disclosure, said borescope plug extends toward but does not cross said tube boss.

A method of sealing a borescope inspection port according to another disclosed non-limiting embodiment of the present disclosure includes mounting a housing with a borescope inspection port fitting to surround a borescope inspection port.

In a further embodiment of any of the foregoing embodiments of the present disclosure, a secondary airflow communicates through the housing.

In a further embodiment of any of the foregoing embodiments of the present disclosure, includes the secondary airflow communicates from the housing into an airflow tube.

In a further embodiment of any of the foregoing embodiments of the present disclosure, a borescope plug is removably mounted into the housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
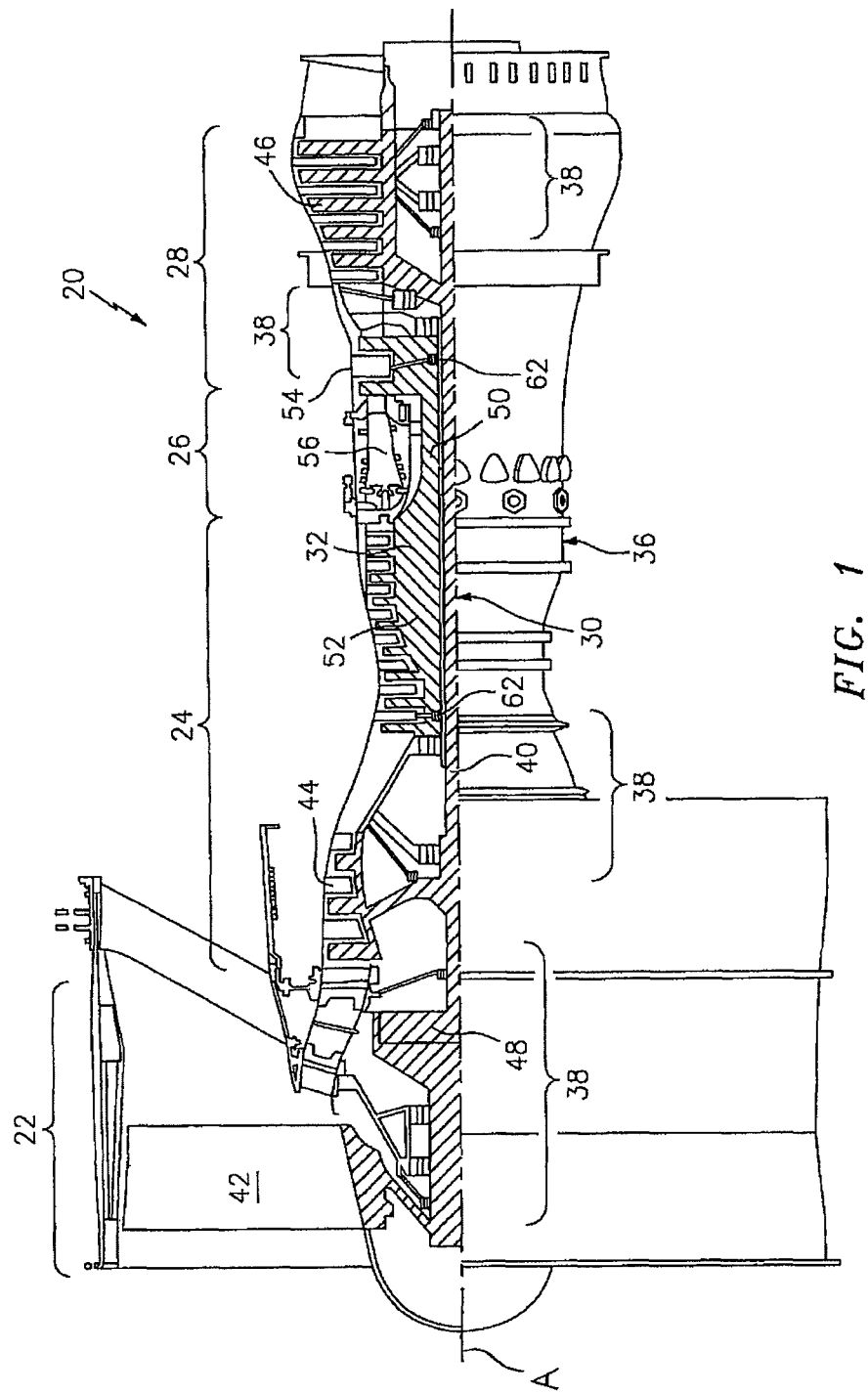
FIG. 1 is a schematic cutaway of an example gas turbine engine architecture.
Figure 2:
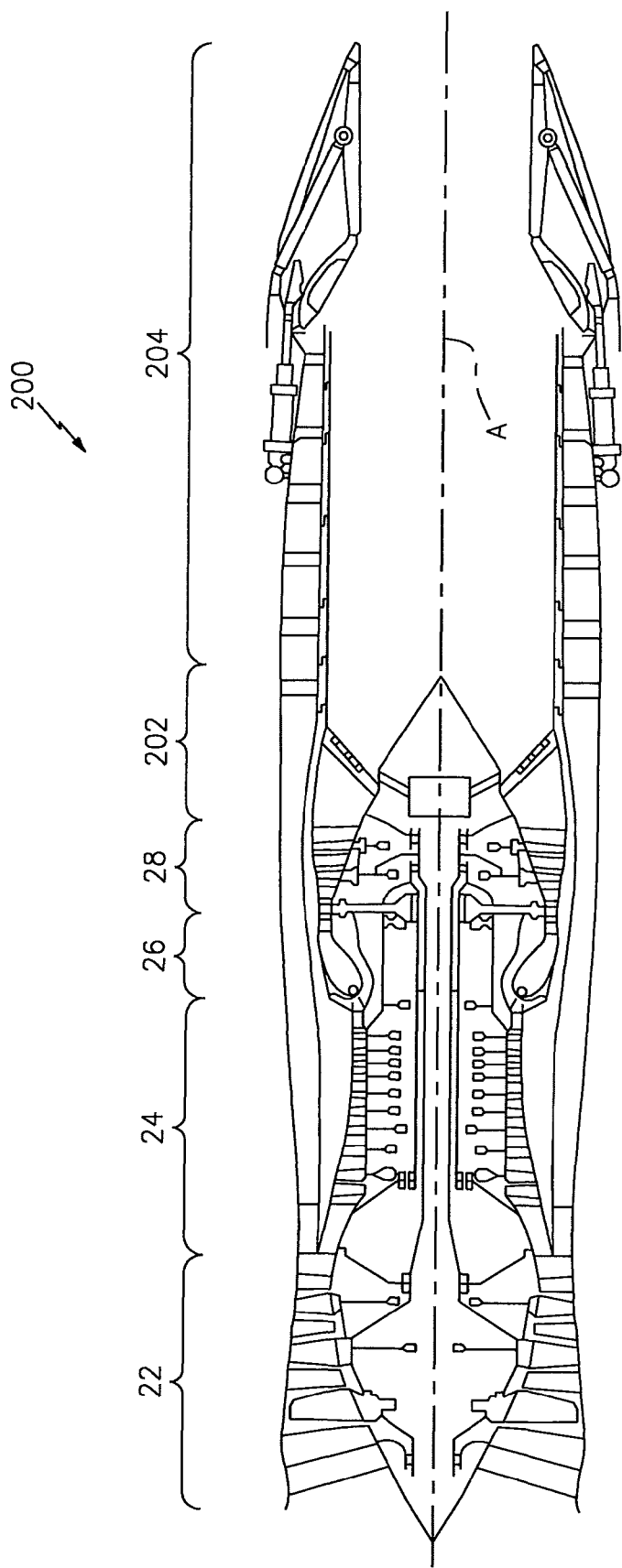
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, an alternative engine architecture 200 may also include an augmentor section 202 and an exhaust duct section 204 among other systems or features. Referring again to FIG. 1, the fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan (FIG. 2), turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly, or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

Figure 3:
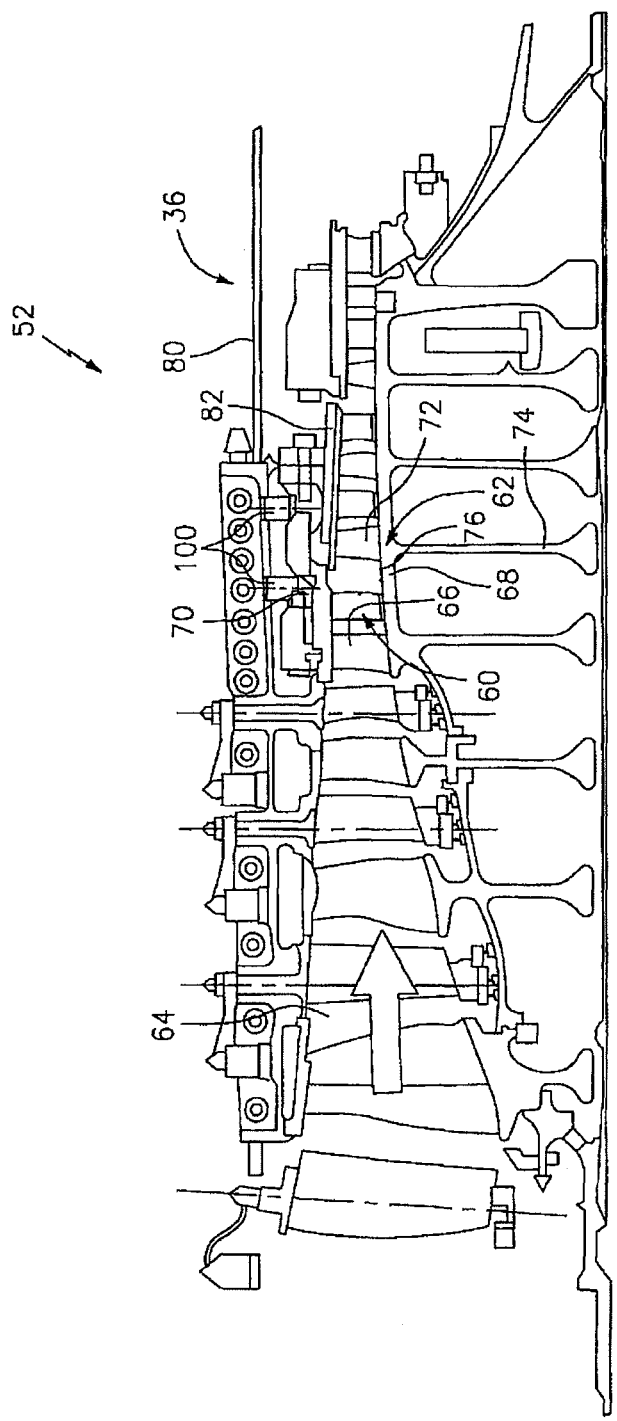
FIG. 3 is an expanded cross-sectional view of a high pressure compressor section of an example gas turbine engine.

With reference to FIG. 3, the HPC 52 generally includes a plurality of stages with alternate stationary vane assemblies 60 and rotational rotor assemblies 62 along an HPC airflow passage 64. Although the HPC 52 is illustrated in the disclosed non-limiting embodiment, other engine sections such as the combustor section 26 and the turbine section 28 will also benefit herefrom. Moreover, although a particular number of HPC stages are illustrated, it should be appreciated that any number of stages will benefit herefrom.

Each of the vane assemblies 60 are mounted to the engine static structure 36 and include a plurality of airfoils 66 between a radial inner platform 68 and a radial outer platform 70. Each of the rotor assemblies 62 includes a plurality of blades 72 supported by a respective rotor assembly 74. The radial inner platform 68 and the radial outer platform 70 of the vane assemblies 60 and a platform 76 that extends from each of the blades 72 generally bounds the HPC airflow passage 64.

Figure 4:
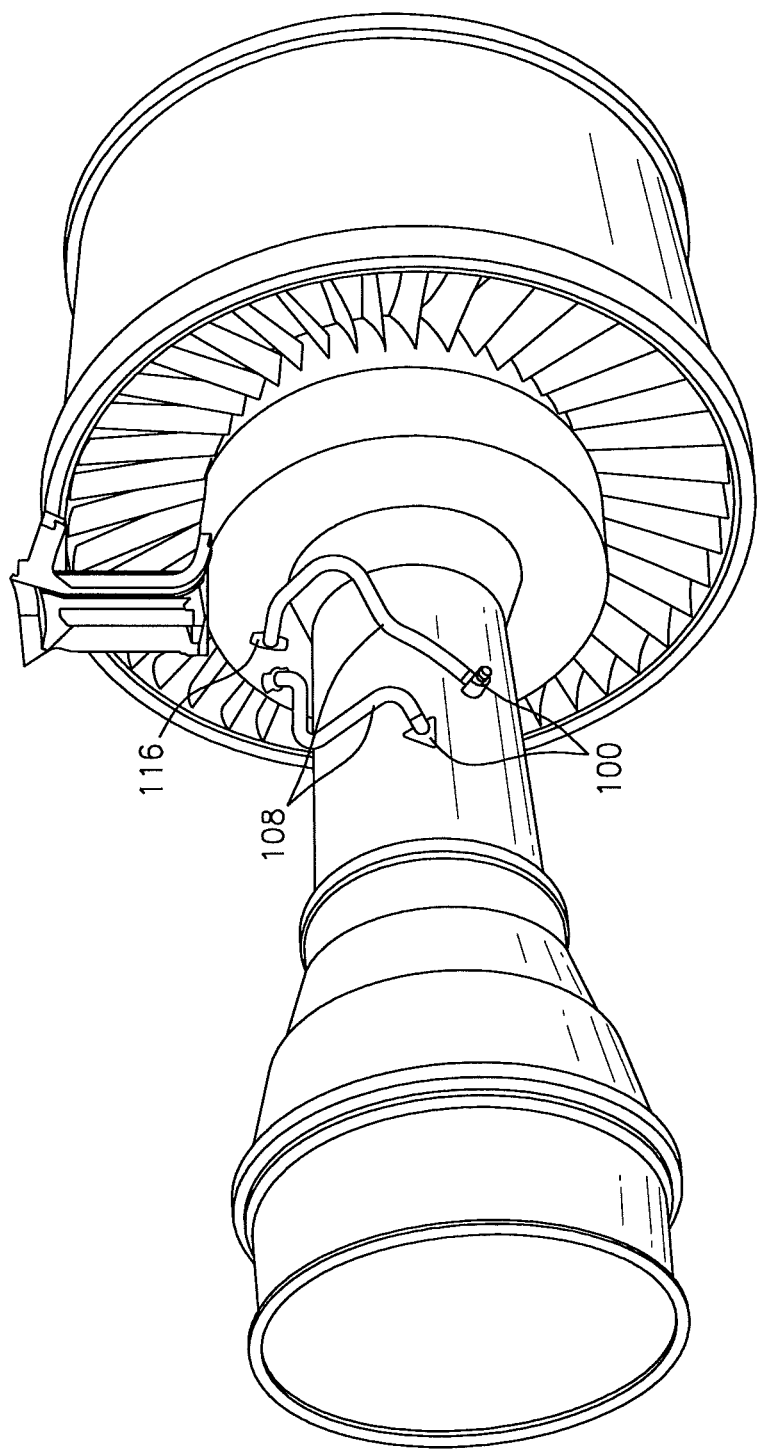
FIG. 4 is a schematic external perspective view of the gas turbine engine of FIG. 1.

Each stage may include a borescope inspection (BSI) port 100 (two shown schematically; see also FIG. 4) typically located at about the three o'clock and/or nine o'clock positions to facilitate maintenance accessibility. That is, the three o'clock and nine o'clock positions facilitate on-wing access.

Figure 5:
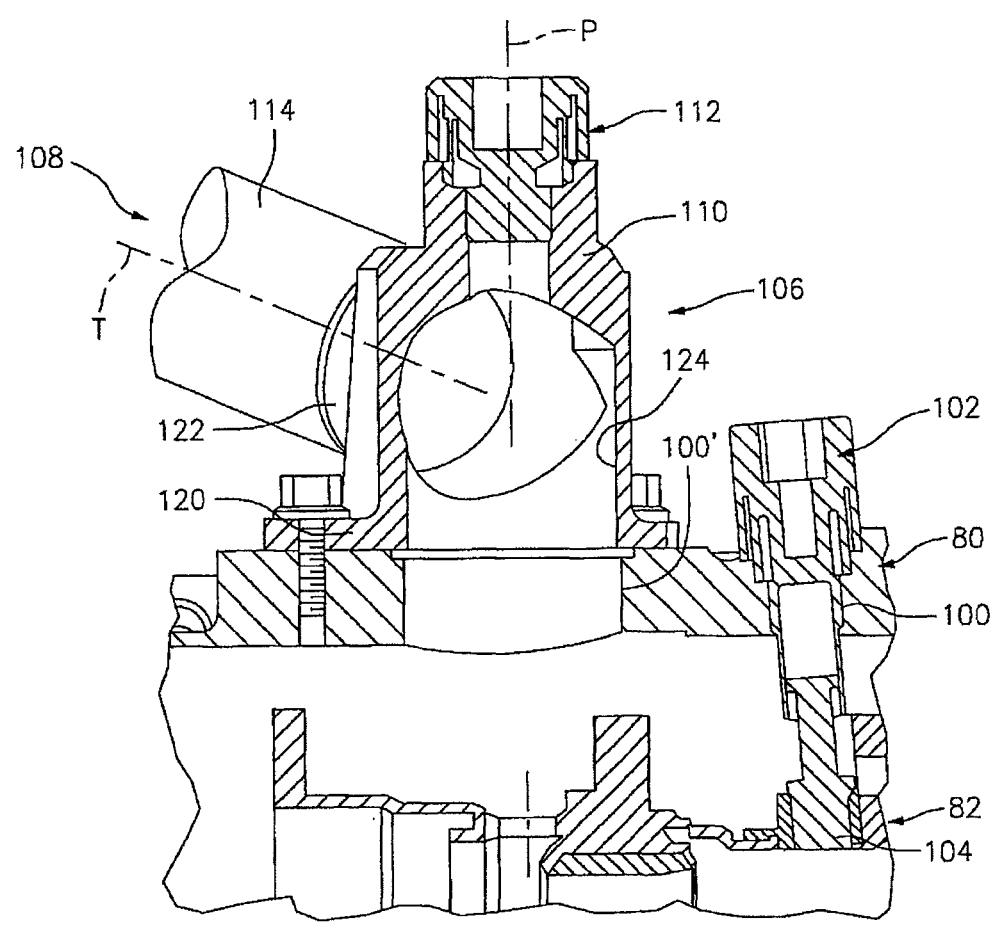
FIG. 5 is a cross sectional view of a borescope inspection (BSI) port fitting.

With reference to FIG. 5, the BSI port 100 extends through an outer case structure 80 and an inner case structure 82 to provide borescope access between airfoils 66 (see FIG. 3) to view the associated forward and aft blades 72 of the respective rotor assembly 74. That is, the inner case structure 82 is generally defined by the radial outer platform 70 of the vane assemblies 60 of the HPC 52 (see FIG. 3). One example BSI port 100 is sealed with a BSI plug 102 that is threaded directly into the outer case structure 80 to seal with the inner case structure 82 at a tip 104. It should be appreciated that the BSI plug 102 may alternatively only seal with the outer case structure 80. It should be appreciated that the BSI plug 102 may have various geometries.

Figure 6:
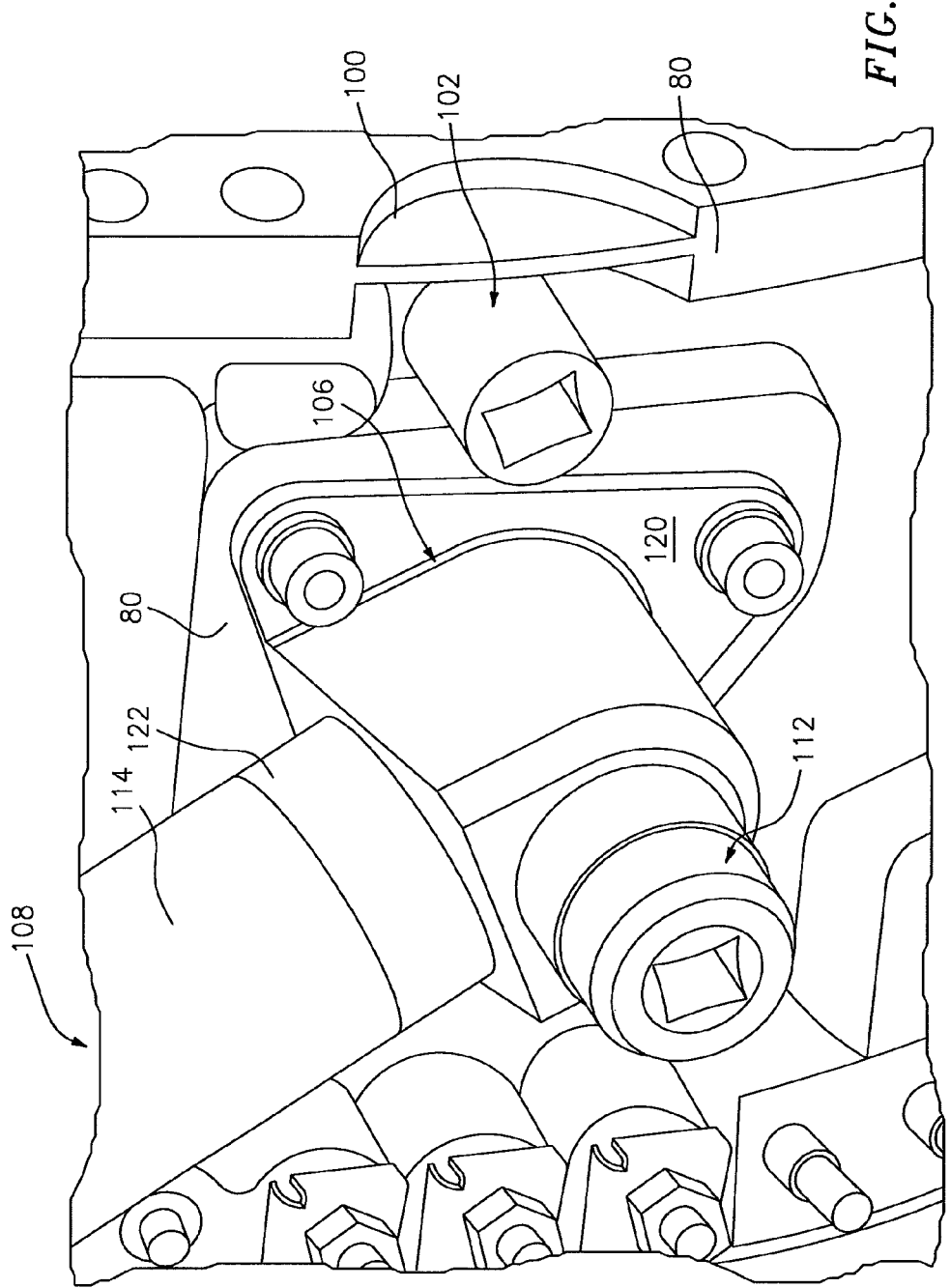
FIG. 6 is an expanded perspective view of the borescope inspection (BSI) port fitting.

Another example BSI port 100' is surrounded by a borescope inspection (BSI) port fitting 106 that is mounted to the outer case structure 80 (also shown in FIG. 6). The borescope inspection (BSI) port fitting 106 may be integrated with an airflow tube assembly 108 located external to the outer case structure 80 that is otherwise conventionally separately mounted to the outer case structure 80. The airflow tube assembly 108 communicates bleed airflow from the associated stage to another section or subsystem of the engine (see FIG. 4).

With continued reference to FIG. 5, the borescope inspection (BSI) port fitting 106 generally includes a housing 110, and a borescope plug 112. The housing 110 provides attachment for an airflow tube 114 of the airflow tube assembly 108 to communicate bleed airflow from the associated stage to, for example, a valve 116 (see FIG. 4) for use in other engine sections or systems. That is, the bleed air supplied to the airflow tube 114 is received from the same cavity that provides borescope access. It should be appreciated that a plurality of air tubes may be associated with a single valve 116 to, for example, accommodate various operational conditions.

Figure 7:
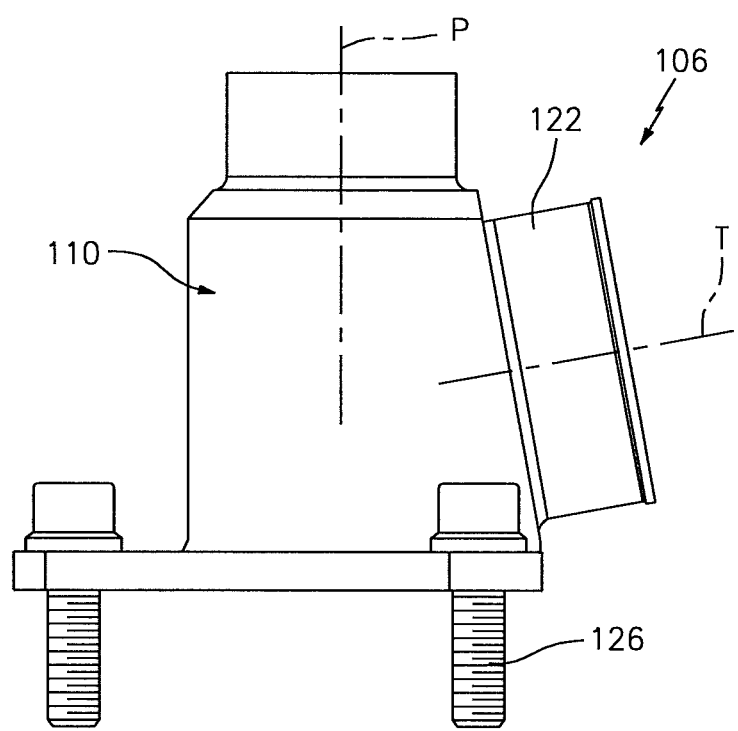
FIG. 7 is a side view of a borescope inspection (BSI) port fitting.
Figure 8:
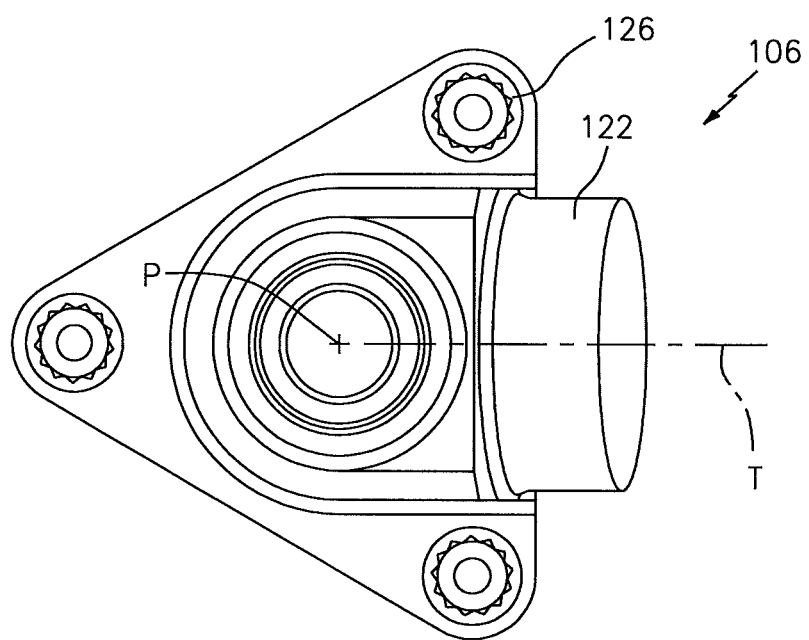
FIG. 8 is a top view of a borescope inspection (BSI) port fitting.

The housing 110 generally includes a flange 120. The housing 110 defines a tube boss 122 and a borescope inspection port 124. The tube boss 122 defines a tube axis T transverse to a bore plug axis P of the borescope inspection port 124 (FIG. 7). The airflow tube 114 may be welded or otherwise fastened to the tube boss 122. The housing 110 is mounted to the outer case structure 80 with a plurality of fasteners 126 that extend through the flange 120 and into the outer case structure 80. In one disclosed non-limiting embodiment, the flange is triangular shaped with three (3) fasteners 126 (see FIG. 8).

The borescope plug 112 is threaded or otherwise removably mounted to the housing 110. It should be appreciated that the borescope plug 112 may have various geometries. The borescope plug 112 may be relatively short so as not to impinge airflow through the tube boss 122 into the airflow tube 114.

The borescope inspection (BSI) port fitting 106 beneficially permits a single case port to have multiple uses that provides a more efficient use of available case area to accommodate necessary system and maintenance features. Optimized external system packaging is also facilitated.

It should be understood that relative positional terms such as "forward," "aft," "upper," "lower," "above," "below," "bottom", "top", and the like are with reference to the normal operational attitude of the engine 20 and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A borescope inspection (BSI) port fitting for a gas turbine engine, the borescope inspection (BSI) port fitting comprising:
    a housing comprising a borescope inspection port and a tube boss;
    wherein said tube boss is transverse to said borescope inspection port; and
    wherein said housing includes a flange with a plurality of fastener apertures.

2. The borescope inspection (BSI) port fitting as recited in claim 1, further comprising a borescope plug receivable within said borescope inspection port.

3. The borescope inspection (BSI) port fitting as recited in claim 1, wherein said flange is triangular.

4. An assembly for a gas turbine engine, the assembly comprising:
    an outer case structure comprising a BSI port;
    a borescope inspection (BSI) port fitting mounted to the outer case structure to surround said BSI port, wherein the borescope inspection (BSI) port fitting comprises a flange which is fixedly connected to the outer case structure by one or more fasteners;
    an airflow tube mounted to said borescope inspection (BSI) port fitting; and
    a borescope plug mounted to said borescope inspection (BSI) port fitting.

5. The assembly as recited in claim 4, wherein said borescope inspection (BSI) port fitting includes a tube boss to receive said airflow tube.

6. The assembly as recited claim 5, wherein said borescope inspection (BSI) port fitting defines a borescope inspection port.

7. The assembly as recited claim 6, wherein said tube boss is transverse to said borescope inspection port.

8. The assembly as recited claim 7, wherein said borescope plug is threaded into a bore in said borescope boss.

9. The assembly as recited claim 7, wherein said borescope plug extends toward but does not cross said tube boss.

10. A method of sealing a borescope inspection port, the method comprising:
    mounting a housing to an outer case structure of a gas turbine engine, wherein the housing comprises a borescope inspection port fitting that surrounds a borescope inspection port in the outer case structure, and wherein the housing is fixedly secured to the outer case structure by one or more fasteners;
    wherein the housing further includes a tube boss that is transverse to the borescope inspection port.

11. The method as recited in claim 10, further comprising communicating a secondary airflow through the housing.

12. The method as recited in claim 11, further comprising communicating the secondary airflow from the housing into an airflow tube.

13. The method as recited in claim 11, further comprising removably mounting a borescope plug into the housing.

14. The method as recited in claim 10, further comprising:
    providing an assembly comprising the borescope inspection port, the borescope inspection port fitting, an airflow tube and a borescope plug;
    mounting the airflow tube to the tube boss; and
    mounting the borescope plug to the borescope inspection port fitting.

15. The method as recited in claim 10, wherein the housing is configured as a unitary, monolithic body.

16. The borescope inspection (BSI) port fitting as recited in claim 1, wherein the housing is configured as a unitary, monolithic body.

* * * * *